(12) United States Patent
Ran et al.

(10) Patent No.: US 9,256,418 B2
(45) Date of Patent: Feb. 9, 2016

(54) DYNAMIC APPLICATION IDENTIFIER FOR USE IN AN UPDATE WORKFLOW

(75) Inventors: Alexander S. Ran, Palo Alto, CA (US); Daniel C. McGloin, Coronado, CA (US); Desiree D. G. Gosby, San Francisco, CA (US); Ajay Tripathi, Fremont, CA (US)

(73) Assignee: INTUIT INC., Mountain View, CA (US)

( * ) Notice: Subject to any disclaimer, the term of this patent is extended or adjusted under 35 U.S.C. 154(b) by 187 days.

(21) Appl. No.: 12/913,976

(22) Filed: Oct. 28, 2010

(65) Prior Publication Data

US 2012/0110563 A1  May 3, 2012

(51) Int. Cl.
*G06F 9/44* (2006.01)
*G06F 9/445* (2006.01)
*H04M 1/725* (2006.01)

(52) U.S. Cl.
CPC ............. *G06F 8/65* (2013.01); *H04M 1/72525* (2013.01)

(58) Field of Classification Search
USPC .......................................................... 717/170
See application file for complete search history.

(56) References Cited

U.S. PATENT DOCUMENTS

| | | | | |
|---|---|---|---|---|
| 6,681,391 B1* | 1/2004 | Marino | ...................... | G06F 8/61 711/133 |
| 7,694,291 B2* | 4/2010 | Chen | ......................... | G06F 8/71 717/162 |
| 7,984,435 B2* | 7/2011 | Kokkinen | ................. | G06F 8/68 717/169 |

* cited by examiner

*Primary Examiner* — Don Wong
*Assistant Examiner* — Deric Ortiz
(74) *Attorney, Agent, or Firm* — Park, Vaughan, Fleming & Dowler LLP; Steven E. Stupp (57) ABSTRACT

During an update technique, an update for the software application is received from a provider of the software application. Then, update information is either received from the provider or is generated. This update information specifies an update relationship between the update and at least a previous version of the software application. Next, inventory information associated with a portable electronic device is accessed (such as whether the previous version of the software application is currently installed on the portable electronic device). In response to the accessed inventory information, an identifier associated with the update is dynamically generated, and the update and the dynamically generated identifier are provided to the portable electronic device. Using the dynamically generated identifier, an application management system or the operating system installed on the portable electronic device determines whether an update workflow is executed.

20 Claims, 9 Drawing Sheets

DYNAMIC APPLICATION IDENTIFIER FOR USE IN AN UPDATE WORKFLOW

CROSS REFERENCE TO RELATED APPLICATION

This application is related to pending U.S. patent application Ser. No. 12/913,984, filed on 28 Oct. 2010, entitled "Update Workflow in a Portable Device Based on Metadata," by Alexander S. Ran, Daniel C. McGloin, Desiree D. G. Gosby and Ajay Tripathi, and having, the contents of which are herein incorporated by reference.

BACKGROUND

The present disclosure relates to techniques for updating a software product. More specifically, the present disclosure relates to techniques for providing an update for a software application to a portable electronic device.

Thanks in part to a large and growing number of portable electronic devices, such as cellular telephones, and the associated mobile software applications, portable electronic devices are becoming increasingly popular computing platforms. However, in spite of this market success, the fragmentation of the market and the diversity of users are also making it increasingly difficult to support these software applications. For example, the diversity of hardware and software configurations in portable electronic devices, even within a given model or platform, is making the process of installing and updating software applications increasingly challenging.

The updating of mobile software applications is typically managed by a platform-specific mobile application manager (which is henceforth referred to as an 'application management system'). While the details of the updating process are also often platform dependent, when deciding whether to install an update for a software application, the application management system in a portable electronic device typically checks the application identifier and version number associated with the software application. In particular, when a software application is submitted for installation, the application management system checks the application identifier and version number to determine if it is a 'recognized' new version that can update a previous version of the software application. For example, in a recognized update scenario, a software application $a_1$ is an update to software application $a_0$ if they have the same application identifier and if the version number of software application $a_1$ is greater than the version number of software application $a_0$ (i.e., their version numbers have an ordinal relationship).

If the application management system recognizes the software application as a new version of a previously installed software application, the user is then typically requested to 'approve' the update. Once user approval is received, the application management system executes an update workflow, which involves: removing (or uninstalling) the previous version of the software application; installing the new version of the software application; and, as needed, preserving, removing or transforming data associated with the previous version of the software application for use by the new version of the software application.

The application identifier and version number used by the application management system are typically specified by the application developer when the software application is built or published. However, it can be difficult or impossible for the application developer to specify the application identifier and version number for a given software application in such a way that results in update workflows being performed in the wide variety of portable electronic devices in which a previous version of this software application is installed. This problem is particularly challenging in several important use cases.

For example, it is currently impossible for an application developer to publish a software application as an update to two previously published software applications that had different application identifiers. Thus, if the application developer first created two software-application variants with functionality tailored to different cellular network operators or carriers, there is currently no way to subsequently publish a single version of the software application as an update to both of the previously published variants. Similarly, it may be difficult or impossible for the application developer to publish a single software application as an update to both 'light' and 'full' versions of the software application, or to publish an 'enterprise' version of the software application as an update to both 'professional' and 'premium' variants. Alternatively, it is difficult (if not impossible) for the application developer to publish two software-application variants (for example, for different languages or different geographic locations), either of which can be used to update an earlier version of the software application, because both variants would have to share the same application identifier, which may not be acceptable by software-application distribution channels, such as mobile-application stores.

In these circumstances, a new version of a software application may not be recognized as an 'acceptable' update by the application management system. As a consequence, after downloading the new version of the software application, a user may be forced to try to manually remove the previous version of the software application. In such cases, the data associated with application version being updated may not be accessed by the new version because the two applications are 'seen' as unrelated by the operating system and, therefore, have different data-protection domains. This creates a significant usability problem, which can degrade the user experience, and which makes it more difficult and expensive for application developers to support software updates.

SUMMARY

The disclosed embodiments relate to a computer system that provides an update for a software application to a portable electronic device. During operation, the computer system receives the update for the software application from a provider of the software application. After receiving the update, the computer system accesses inventory information about the portable electronic device. Then, the computer system dynamically generates an identifier associated with the update based on the inventory information and update information, where the update information specifies the update relationship between the update and a previous version of the software application. Next, in response to the accessed inventory information, the computer system provides the update along with the dynamically generated identifier to the portable electronic device, where the dynamically generated identifier facilitates determining whether an update workflow is executed by the portable electronic device.

In particular, the dynamically generated identifier may be used by an application management system that is installed on the portable electronic device, and which determines if the update workflow is executed. Alternatively, the update information may be used by an operating system that is installed on the portable electronic device, and which determines if the update workflow is executed. When executed, the update workflow may include: requesting approval from a user to install the update; removal of the previous version of the software application; installation of the update for the software application; and, as needed, preserving, removing or transforming data associated with the previous version of the software application.

Note that the inventory information may include a request for the update for the software application and/or may indicate whether the previous version of the software application is currently installed on the portable electronic device. Alternatively or additionally, the inventory information may indicate at least one of: a model of the portable electronic device, a hardware configuration of the portable electronic device, a software configuration of the portable electronic device, the hardware and the software configuration of the portable electronic device, and/or a carrier that provides communication service to the portable electronic device.

In some embodiments, prior to accessing the inventory information, the computer system receives the update information from the provider of the software application. Alternatively, the computer system may generate the update information based on information about an inventory of the portable electronic device as represented on the computer system based on previous interactions with the portable electronic device. This update information may specify a history of software applications installed on the portable electronic device and updates to the software applications that were received by the portable electronic device.

However, the dynamically generated identifier may indirectly specify the update relationship. For example, the dynamically generated identifier may include an application identifier and a version number. Furthermore, the dynamically generated identifier may be specific to the portable electronic device. In this way, the update relationship for a particular portable electronic device may be conveyed to this portable electronic device independently from the update relationships of other portable electronic devices.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for providing an update for a software application to a portable electronic device, and a computer-program product (e.g., software) for use with the computer system are described. During this update technique, an update for the software application is received from a provider of the software application. Then, update information is either received from the provider or is generated. This update information specifies an update relationship between the update and at least a previous version of the software application. Next, inventory information associated with the portable electronic device is accessed (such as whether the previous version of the software application is currently installed on the portable electronic device). In response to the accessed inventory information, an identifier associated with the update is dynamically generated, and the update and the dynamically generated identifier are provided to the portable electronic device. Using the dynamically generated identifier, an application management system or the operating system installed on the portable electronic device determines whether an update workflow is executed.

By assisting the portable electronic device in determining whether or not to execute the update workflow, this update technique can facilitate richer update relationships. For example, an application developer can split or merge software-application product lines. Therefore, the update technique can improve the user experience, with a commensurate impact on customer retention, sales and profitability. In addition, the update technique may simplify update management, thereby making it less difficult and expensive for application developers to support software updates.

In the discussion that follows, a user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
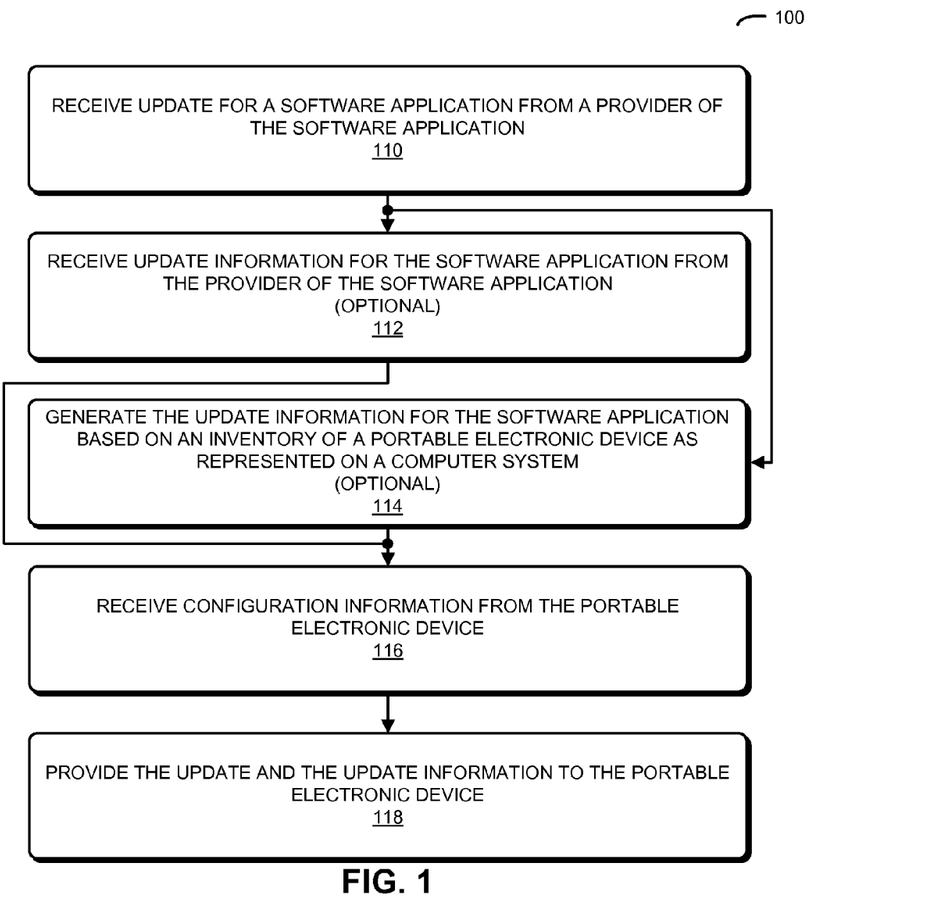
FIG. 1 is a flow chart illustrating a method for providing an update for a software application to a portable electronic device in accordance with an embodiment of the present disclosure.

We now describe embodiments of the update technique. FIG. 1 presents a flow chart illustrating a method 100 for providing an update for a software application to a portable electronic device (such as a cellular telephone), which may be performed by a computer system (such as computer system 600 in FIG. 6) that implements a software delivery service (such as an application store). During operation, the computer system receives the update (or updates) for the software application from a provider or an application developer of the software application (operation 110). After receiving the update, the computer system receives configuration information from the portable electronic device (operation 116). Note that the configuration information may include a request for the update for the software application and/or may indicate whether the previous version of the software application is currently installed on the portable electronic device. Alternatively or additionally, the configuration information may indicate at least one of: a model of the portable electronic device, a hardware configuration of the portable electronic device, a software configuration of the portable electronic device, the hardware and the software configuration of the portable electronic device, and/or a carrier that provides communication service to the portable electronic device.

In some embodiments, prior to receiving the configuration information, the computer system optionally receives the update information from the provider of the software application (operation 112). Alternatively, the computer system may optionally generate the update information based on information about an inventory of the portable electronic device as represented on the computer system based on previous interactions with the portable electronic device (operation 114), which may be stored in a computer-readable data structure that is accessed by the computer system. In some embodiments, the update information associated with the software application is selected or generated based on the received configuration information.

Note that the update information, which is other than an application identifier and a version number associated with the update (i.e., the update information may be different than, and thus independent of, the application identifier and the version number associated with the update), may explicitly specify an update relationship between the update and at least the previous version of the software application. For example, the update information may: specify a history of software applications installed on the portable electronic device; indicate updates to the software applications that were received by the portable electronic device and/or other portable electronic devices; and/or explicitly indicate which previous version(s) of the software application the update(s) updates.

In response to the received configuration information, the computer system provides the update (or the appropriate one of the updates) and the update information to the portable electronic device (operation 118). (Note that, if available, the appropriate update may be selected based on the functionality supported by the computer system and/or the portable electronic device. As described further below, this may ensure that the update triggers an update workflow on the portable electronic device.) For example, the update for the software application and the update information may be provided to the portable electronic device in a data stream, and the update information may be included in a predefined field (at a predefined location) in the data stream. In particular, the update information may include metadata associated with the software application that is included in the predefined field. In addition, the data stream may include the application identifier and/or the version number associated with the update in one or more additional fields. (However, in some embodiments, the application identifier and/or the version number associated with the update are included in the metadata.)

Furthermore, the update information may facilitate determining if the update workflow is executed by the portable electronic device. For example, the update information may be used by an application management system that is installed on the portable electronic device, and which determines if the update workflow is executed, i.e., it determines whether or not the update is a 'recognized' update scenario. (Thus, the decision whether or not to execute the update workflow may be independent of an operating system installed on the portable electronic device.) Alternatively, the update information may be used by the operating system that is installed on the portable electronic device, and which determines if the update workflow is executed. When executed, the update workflow may include: requesting user approval to install the update; removal of the previous version of the software application, installation of the update for the software application and, as needed, preserving, removing or transforming data associated with the previous version of the software application.

Figure 2:
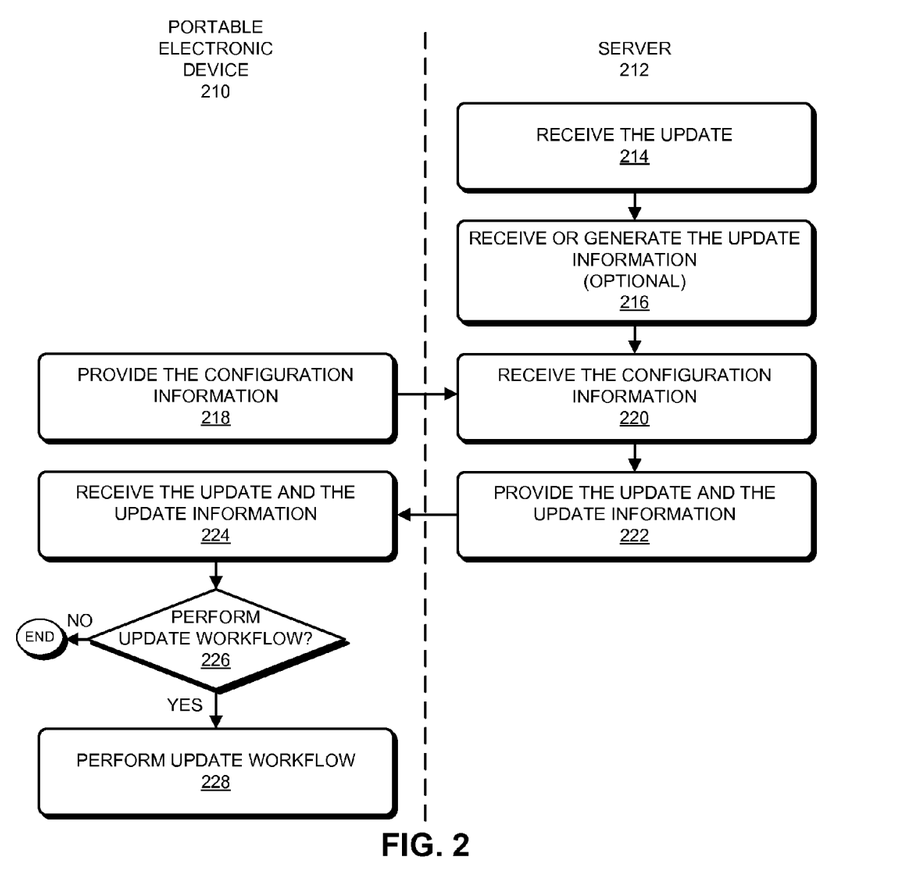
FIG. 2 is a flow chart illustrating the method of FIG. 1 in accordance with an embodiment of the present disclosure.

In an exemplary embodiment, the update technique is implemented using one or more portable electronic devices and at least one computer system (such as a server), which communicate through a network, such as a wireless network provided by a carrier. This is illustrated in FIG. 2, which presents a flow chart illustrating method 100. During this method, server 212 may receive the update (or updates) for the software application (operation 214). Then, server 212 optionally generates the update information or optionally receives the update information from the provider or the application developer (operation 216).

Next, portable electronic device 210 may provide the configuration information (operation 218), which is received by server 212 (operation 220). This configuration information may, directly or indirectly, include a check or request for an available update to the previous version of the software application installed on the portable electronic device.

In response to the received configuration information, server 212 may provide the update and the update information to portable electronic device 210 (operation 222). As noted previously, this update information may offer additional degrees of freedom to explicitly specify the update relationship (independently of the application identifier or version number associated with the update) between the update for the software application and any previous versions of the software application that are installed on portable electronic device 210 (thus, the update information may be specific to portable electronic device 210). These additional degrees of freedom may allow the application developer to specify the update relationship between a new version of the software application and a set of previous versions of the software application that are installed on multiple portable electronic devices at the time of publishing (i.e., at the time of operation 214). In some embodiments, the update information includes metadata, such as a publisher, application developer or vendor associated with the software application.

After receiving the update and the update information (operation 224), portable electronic device 210 (or software installed and executing on portable electronic device 210) may determine whether to perform the update workflow (operation 226). If yes, portable electronic device 210 may perform the update workflow (operation 228).

While the preceding embodiment illustrated the communication of the update information to the portable electronic device, where it is then used to determine whether or not to execute the update workflow, in other embodiments at least a portion of the control logic used to determine whether or not to execute the update workflow is implemented in the computer system. In particular, the computer system may access stored inventory information about the portable electronic device (such as information that indicates whether the previous version of the software application is currently installed on the portable electronic device) in a computer-readable data structure. Using this inventory information, the computer system may dynamically generate an identifier, such as an application identifier and/or a version number associated with the update, which is then provided to the portable electronic device (instead of the update information) along with the update for the software application. This dynamically generated identifier may be used by the application management system or the operating system installed on the portable electronic device to determine if the update workflow is executed. Note that this embodiment may be compatible with the existing hardware and/or software in portable electronic devices (although it does involve modification of the computer system or server that delivers the software application to the portable electronic device) and, as such, may facilitate more-rapid adoption of the upload technique.

Figure 3:
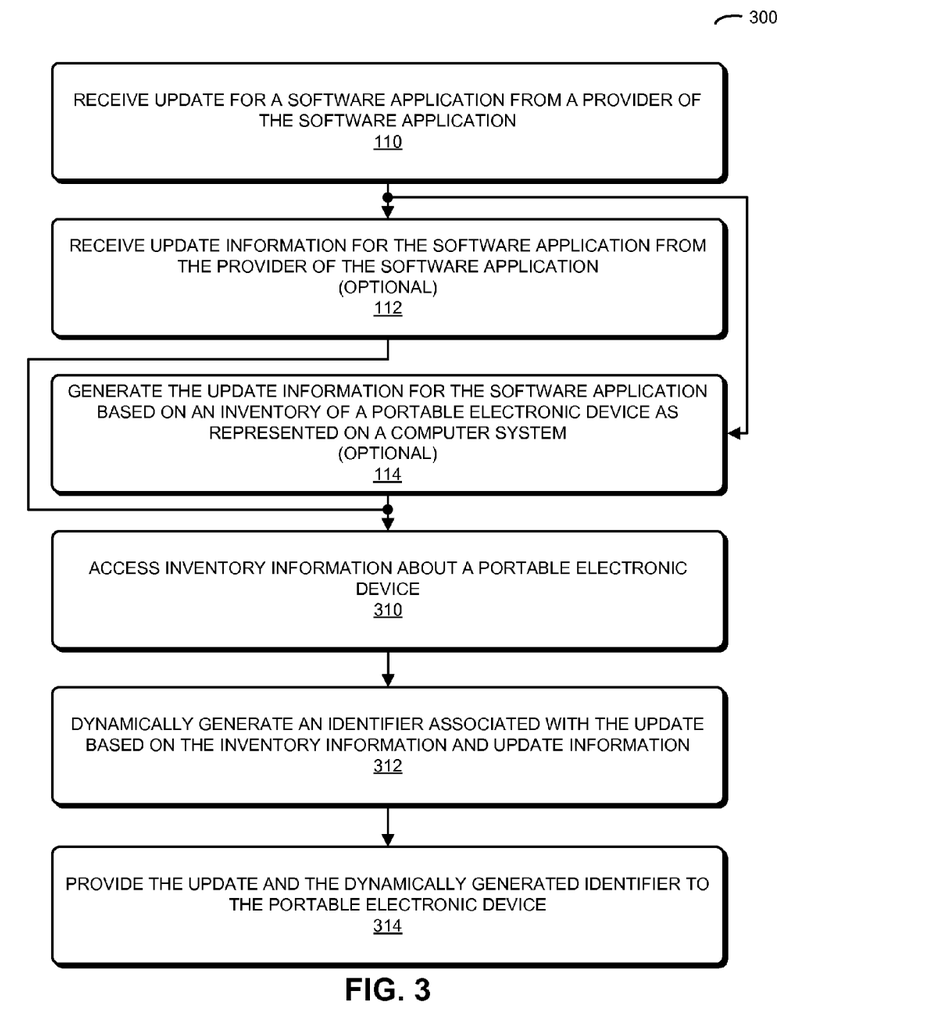
FIG. 3 is a flow chart illustrating a method for providing the update for the software application to the portable electronic device in accordance with an embodiment of the present disclosure.

This embodiment is illustrated in FIG. 3, which presents a flow chart illustrating a method 300 for providing the update for the software application to the portable electronic device, which may be performed by the computer system that implements a software delivery service (such as an application store). During operation, the computer system receives the update (or updates) for the software application from the provider of the software application (operation 110). After receiving the update, the computer system accesses inventory information about the portable electronic device (operation 310). Note that the inventory information may include the request for the update for the software application and/or may indicate whether the previous version of the software application is currently installed on the portable electronic device. Alternatively or additionally, the inventory information may indicate at least one of: the model of the portable electronic device, the hardware configuration of the portable electronic device, the software configuration of the portable electronic device, the hardware and the software configuration of the portable electronic device, and/or the carrier that provides communication service to the portable electronic device.

In some embodiments, prior to accessing the inventory information, the computer system optionally receives the update information (such as the metadata) from the provider of the software application (operation 112). Alternatively, the computer system may optionally generate the update information based the inventory of the portable electronic device as represented on the computer system based on previous interactions with the portable electronic device (operation 114).

Then, the computer system dynamically generates the identifier associated with the update based on the inventory information and the update information (operation 312), where the update information explicitly specifies the update relationship between the update and the previous version of the software application. (For example, as noted previously, the update information may: specify the history of software applications installed on the portable electronic device; indicate updates to the software applications that were received by the portable electronic device and/or other portable electronic devices; and/or explicitly indicate which previous version(s) of the software application the update(s) updates. Alternatively or additionally, at least some of this update information may be included in the inventory information.) However, unlike method 100 in FIG. 1, the dynamically generated identifier may indirectly specify the update relationship. For example, the dynamically generated identifier may include an application identifier and/or a version number associated with the update. Furthermore, the dynamically generated identifier may be specific to the portable electronic device (i.e., it may be independent of the application identifier and/or version number associated with the software application on other portable electronic devices). In this way, the update relationship for a particular portable electronic device may be conveyed to this portable electronic device independently from the update relationships of other portable electronic devices.

Next, in response to the accessed inventory information, the computer system provides the update (or the appropriate one of the updates) and the dynamically generated identifier (but not the update information) to the portable electronic device (operation 314), where the dynamically generated identifier facilitates determining if the update workflow is executed by the portable electronic device. (Note that, if available, the appropriate update may be selected based on the functionality supported by the computer system and/or the portable electronic device. As described further below, in conjunction with the dynamically generated identifier this may ensure that the update triggers the update workflow on the portable electronic device.) In particular, the dynamically generated identifier may be used by the application management system that is installed on the portable electronic device, and which determines if the update workflow is executed. (Thus, the decision whether or not to execute the update workflow may be independent of the operating system installed on the portable electronic device.) Alternatively, the update information may be used by the operating system that is installed on the portable electronic device, and which determines if the update workflow is executed.

Figure 4:
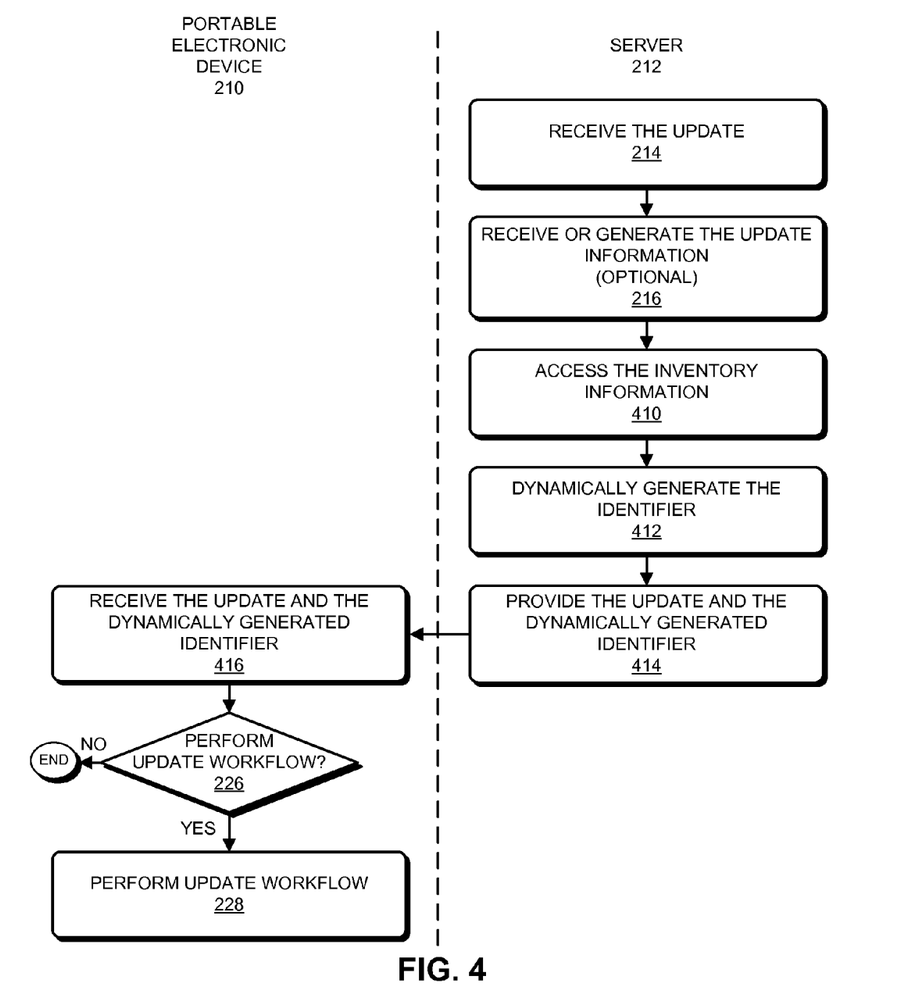
FIG. 4 is a flow chart illustrating the method of FIG. 2 in accordance with an embodiment of the present disclosure.

In an exemplary embodiment, this embodiment of the update technique is implemented using one or more portable electronic devices and at least one computer system (such as the server), which communicate through a network, such as a wireless network provided by a carrier. This is illustrated in FIG. 4, which presents a flow chart illustrating method 300. During this method, server 212 may receive the update (or updates) for the software application (operation 214). Then, server 212 optionally generates the update information or optionally receives the update information from the provider or the application developer (operation 216).

Next, server 212 may access the inventory information (operation 410). This inventory information may, directly or indirectly, include a check or request for an available update to the previous version of the software application installed on portable electronic device 210. For example, the inventory information may indicate whether the previous version of the software application is currently installed on portable electronic device 210. If there is an available update for this previous version of the software application, server 212 may deem this to be an indirect request for the update. More generally, the inventory information may include: what versions of software applications have been delivered to particular portable electronic devices, as well as the associated application identifiers and/or version numbers (which may have been provided by the application developer during operation 214).

Furthermore, server 212 may dynamically generate the identifier associated with the update based on the inventory information and the update information (operation 412), which, as noted previously, may explicitly represent the update relationship(s). As noted previously, this dynamically generated identifier may offer additional degrees of freedom to indirectly specify the update relationship (independently of the application identifiers and/or version numbers associated with the software application on other portable electronic devices, including those that have the same model or platform as portable electronic device 210) between the update for the software application and any previous versions of the software application that are installed on portable electronic device 210 (thus, the dynamically generated identifier may be specific to portable electronic device 210). For example, after previously publishing two different software applications (such as an English version and a French version), which each have their own application identifiers, an application developer can publish a common software application for both languages that updates either of the previous versions using dynamically generated identifiers that are specific to portable electronic devices on which the previous versions are installed (in particular, the dynamically generated application identifier associated with a given portable electronic device may match that of the previous version currently installed on this portable electronic device).

Additionally, in response to the accessed inventory information, server 212 may provide the update along with the dynamically generated identifier to portable electronic device 210 (operation 414). After receiving the update and the dynamically generated identifier (operation 416), portable electronic device 210 (or software installed and executing on portable electronic device 210) determines whether to perform the update workflow (operation 226). If yes, portable electronic device 210 performs the update workflow (operation 228).

In some embodiments of methods 100 (FIGS. 1 and 2) and 300 (FIGS. 3 and 4) there may be additional or fewer operations. Moreover, the order of the operations may be changed, and/or two or more operations may be combined into a single operation. For example, 'dynamically generating the identifier' in operation 412 may include selecting, at the time of delivery, the identifier from a set of previously generated identifiers that encompass the identifiers needed to trigger the update workflow on a wide variety of portable electronic devices having: different models or platforms, different hardware configurations and/or different software configurations. Furthermore, in methods 100 (FIGS. 1 and 2) and 300 (FIGS. 3 and 4) security techniques known to one of skill in the art may be included to prevent an update for a software application by one or more unauthorized parties, such as unauthorized: application developers, publishers or application delivery services.

Note that while a distinction was made between the identifier and/or the dynamically generated identifier (such as the application identifier) and the update for the software application in the preceding embodiments, in some embodiments the identifier and/or the dynamically generated identifier (such as the application identifier) may also be embedded in the update. Thus, the update and the identifier and/or the dynamically generated identifier may not be separate entities. As a consequence, the identifier and/or the dynamically generated identifier may be consistent with the update package, and thus may need to be changed or revised together. Alternatively, there may be a set of pre-generated updates that have or include different identifiers, and the appropriate update (and identifier) for a given portable electronic device at the time of the update may be selected.

Figure 5:
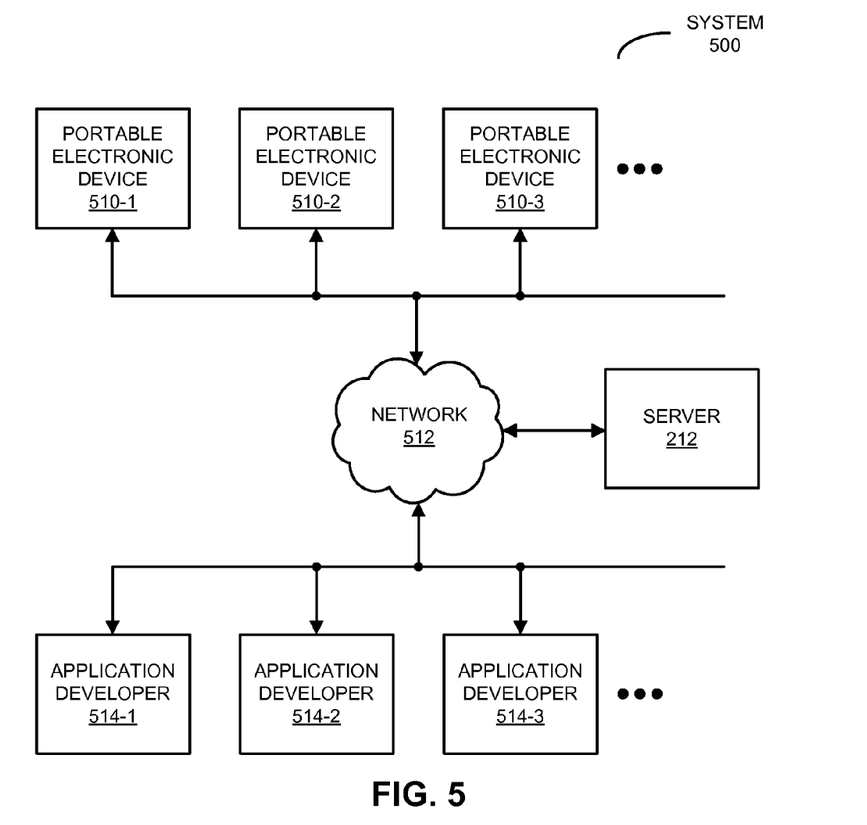
FIG. 5 is a block diagram illustrating a system that performs the method of FIG. 1 or 3 in accordance with an embodiment of the present disclosure.

We now describe embodiments of the computer system and its use. FIG. 5 presents a block diagram illustrating a system 500 that performs methods 100 (FIGS. 1 and 2) and/or 300 (FIGS. 3 and 4). In this system, a previous version of a software application (such as financial software) may be installed on a portable electronic device of a user, such as one of portable electronic devices 510 (for example, portable electronic device 510-1). This software application may be a stand-alone application or a portion of another application that is resident on and which executes on portable electronic device 510-1.

Furthermore, server 212 may receive an update (or updates) for the software application, as well as update information, from one of application developers 514 via network 512. Alternatively or additionally, server 212 may generate the update information based on information stored in a computer-readable data structure (not shown), such as information about the previous version of the software application. As noted previously, the update information may be independent of the application identifier and/or the version number associated with the previous version of the software application, and may explicitly specify the update relationship between the update and at least the previous version of the software application.

In some embodiments, portable electronic device 510-1 provides the configuration information to server 212 via network 512. As noted previously, the configuration information may indicate whether the previous version of the software application is currently installed on portable electronic device 510-1. In response to the received configuration information, server 212 may provide, via network 512, the update along with update information, the application identifier associated with the update and/or the version number associated with the update to portable electronic device 510-1. Either an application management system or an operating system (such as an embedded operating system or a real-time operating system) installed and executing on portable electronic device 510-1 may use the update information, the application identifier associated with the update and/or the version number associated with the update to determine whether or not to execute the update workflow.

Alternatively, in some embodiments, server 212 accesses the inventory information about the portable electronic device 510-1, which is stored in a computer-readable data structure (not shown). As noted previously, the inventory information may indicate whether the previous version of the software application is currently installed on portable electronic device 510-1. Then, server 212 may dynamically generate the identifier associated with the update based on the inventory information and the update information. Furthermore, in response to the accessed inventory information, server 212 may provide, via network 512, the update along with the dynamically generated identifier to portable electronic device 510-1. Either an application management system or the operating system installed and executing on portable electronic device 510-1 may use the dynamically generated identifier to determine whether or not to execute the update workflow.

Note that information in computer system 500 (such as the inventory information) may be stored at one or more locations in computer system 500 (i.e., locally or remotely). Moreover, because this data may be sensitive in nature, it may be encrypted. For example, stored data and/or data communicated via network 512 may be encrypted.

Figure 6:
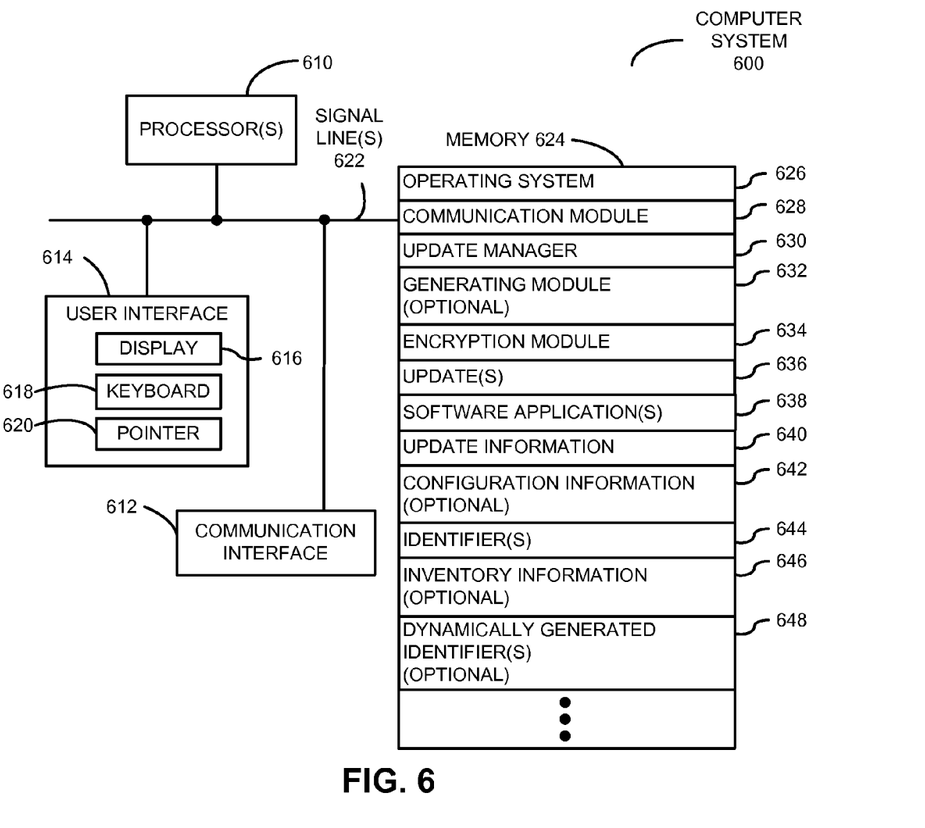
FIG. 6 is a block diagram illustrating a computer system that performs the method of FIG. 1 or 3 in accordance with an embodiment of the present disclosure.

FIG. 6 presents a block diagram illustrating a computer system 600 that performs methods 100 (FIGS. 1 and 2) and/or 300 (FIGS. 3 and 4), such as server 212 (FIG. 5). Computer system 600 includes one or more processing units or processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: update manager 630 (or a set of instructions), optional generating module 632 (or a set of instructions), and/or encryption module 634 (or a set of instructions). Note that one or more of these program modules (or sets of instructions) may constitute a computer-program mechanism.

During method 100 (FIGS. 1 and 2), update manager 630 may receive one or more updates 636 for one or more corresponding software applications 638, as well as update information 640, from an application developer. Note that update information 640 may specify: a history of software applications installed on one or more portable electronic devices; indicate updates to the software applications that were received by the one or more portable electronic devices and/or other portable electronic devices; and/or explicitly indicate which previous version(s) of the software application that the one or more updates 636 update.

Figure 7:
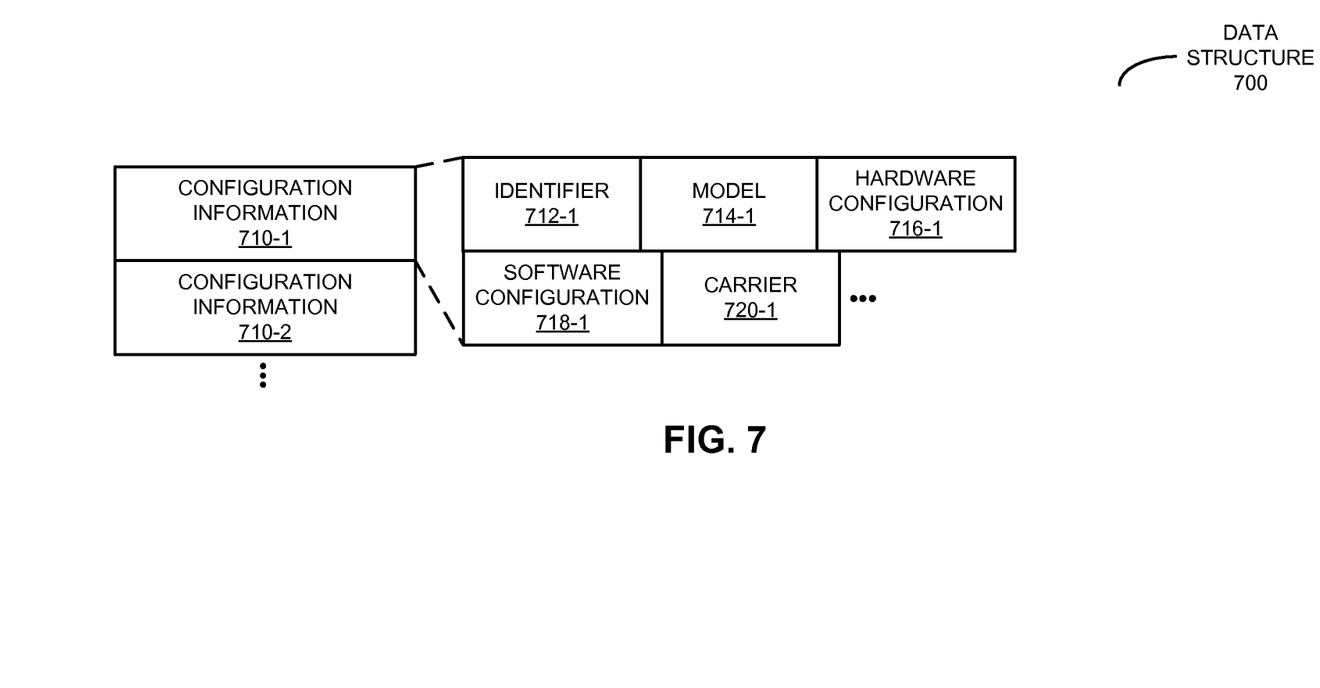
FIG. 7 is a block diagram illustrating a data structure for use in the computer system of FIG. 6 in accordance with an embodiment of the present disclosure.

Alternatively or additionally, optional generating module 632 may generate update information 640 based on information stored in a computer-readable data structure. For example, a portable electronic device may provide optional configuration information 642 that indicates whether a previous version of one of software applications 638 is currently installed on the portable electronic device. Configuration information is illustrated in FIG. 7, which presents a block diagram illustrating a data structure 700. In particular, data structure 700 may include configuration information 710. For example, configuration information 710-1 may include: an identifier 712-1 of the portable electronic device, a model (or platform) 714-1 of the portable electronic device, a hardware configuration 716-1 of the portable electronic device, a software configuration 718-1 of the portable electronic device, and/or a carrier 720-1 that provides communication service to the portable electronic device. Note that software configuration 718-1 may include versions of software application(s) installed on the portable electronic device.

Referring back to FIG. 6, as noted previously, update information 640 may be independent of one or more identifiers 644 (such as the application identifier and/or the version number) associated with the previous version of the software application, and may explicitly specify the update relationship between one of updates 636 and at least the previous version of the software application.

In response to the received optional configuration information 642, update manager 630 may provide one of updates 636 along with update information 640 and/or the one or more identifiers 644 associated with one of updates 636 to the portable electronic device. The subsequent operation of the portable electronic device is described further below with reference to FIG. 9.

Figure 8:
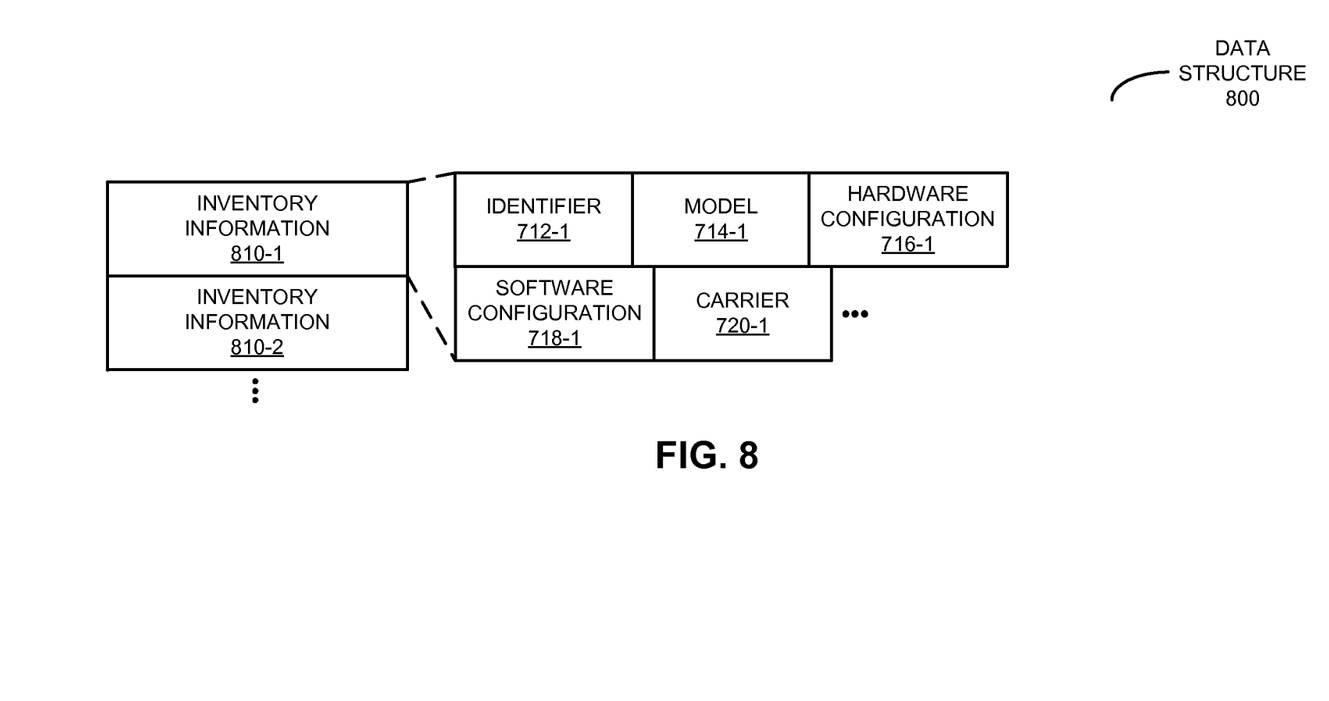
FIG. 8 is a block diagram illustrating a data structure for use in the computer system of FIG. 6 in accordance with an embodiment of the present disclosure.

Alternatively, during method 300 (FIGS. 3 and 4), update manager 630 may receive one or more updates 636 for the one or more corresponding software applications 638, as well as update information 640, from an application developer. Alternatively or additionally, optional generating module 632 may generate update information 640 based on information stored in a computer-readable data structure. For example, update information 640 may be generated based on optional inventory information 646 that indicates whether the previous version of one of software applications 638 is currently installed on the portable electronic device. Inventory information is illustrated in FIG. 8, which presents a block diagram illustrating a data structure 800. In particular, data structure 800 may include inventory information 810. For example, inventory information 810-1 may include: an identifier 712-1 of the portable electronic device, a model 714-1 of the portable electronic device, a hardware configuration 716-1 of the portable electronic device, a software configuration 718-1 of the portable electronic device, and/or a carrier 720-1 that provides communication service to the portable electronic device. Note that software configuration 718-1 may include versions of software application(s) installed on the portable electronic device.

Referring back to FIG. 6, optional generating module 632 may dynamically generate optional identifier(s) 648 for one of updates 636 based on optional inventory information 646 and update information 640. Furthermore, in response to the accessed optional inventory information 646, update manager 630 may provide one of updates 636 along with optional dynamically generated identifier(s) 648 to the portable electronic device. The subsequent operation of the portable electronic device is described further below with reference to FIG. 9.

Note that at least some of the data stored in memory 624 and/or at least some of the data communicated using communication module 628 is encrypted using encryption module 634.

Figure 9:
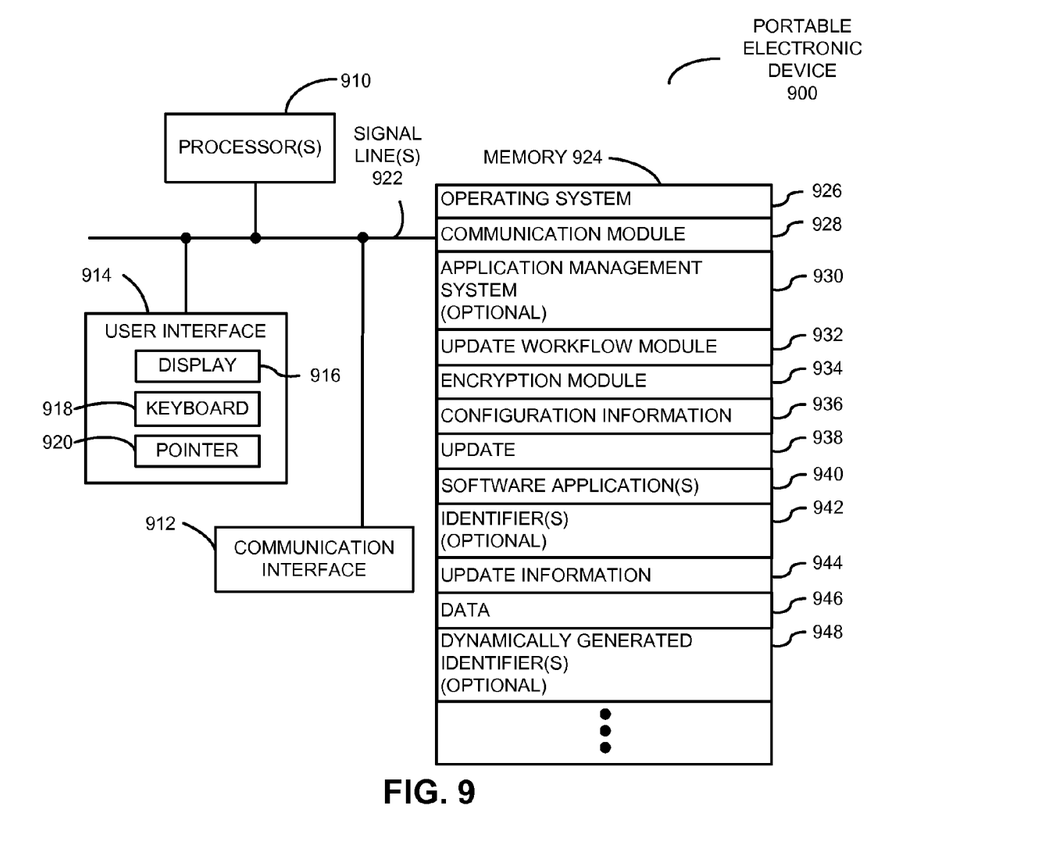
FIG. 9 is a block diagram illustrating a portable electronic device in accordance with an embodiment of the present disclosure.

FIG. 9 presents a block diagram illustrating a portable electronic device 900. Portable electronic device 900 includes one or more processing units or processors 910, a communication interface 912, a user interface 914, and one or more signal lines 922 coupling these components together. Note that the one or more processors 910 may support parallel processing and/or multi-threaded operation, the communication interface 912 may have a persistent communication connection, and the one or more signal lines 922 may constitute a communication bus. Moreover, the user interface 914 may include: a display 916, a keyboard 918, and/or a pointer 920, such as a mouse.

Memory 924 in portable electronic device 900 may include volatile memory and/or non-volatile memory. More specifically, memory 924 may include: ROM, RAM, EPROM, EEPROM, flash memory, one or more smart cards, one or more magnetic disc storage devices, and/or one or more optical storage devices. Memory 924 may store an operating system 926 that includes procedures (or a set of instructions) for handling various basic system services for performing hardware-dependent tasks. Memory 924 may also store procedures (or a set of instructions) in a communication module 928. These communication procedures may be used for communicating with one or more computers and/or servers, including computers and/or servers that are remotely located with respect to portable electronic device 900.

Memory 924 may also include multiple program modules (or sets of instructions), including: optional application management system 930 (or a set of instructions), update workflow module 932 (or a set of instructions), and/or encryption module 934 (or a set of instructions). Note that one or more of these program modules (or sets of instructions) may constitute a computer-program mechanism.

During method 100 (FIGS. 1 and 2), operating system 926 and/or optional application management system 930 may provide configuration information 936 to computer system 600 (FIG. 6). Subsequently, update 938 for one or more of software applications 940 is received, along with optional identifier(s) 942 (such as an application identifier and/or a version number associated with update 938) and update information 944.

Next, operating system 926 and/or optional application management system 930 determine whether or not to execute update workflow module 932 based on optional identifier(s) 942 and update information 944. When executed, update workflow module 932 may: request user approval to install update 938; uninstall a previous version of one of software applications 940; install update 938; and preserve, remove or transform data 946 associated with the previous version of this software application.

Alternatively, during method 300 (FIGS. 3 and 4), update 938 for one of software applications 940 is received, along with optional dynamically generated identifier(s) 948 (such as a dynamically generated application identifier and/or a dynamically generated version number associated with update 938). Next, operating system 926 and/or optional application management system 930 determine whether or not to execute update workflow module 932 based on optional dynamically generated identifier(s) 948. When executed, update workflow module 932 may: request user approval to install update 938; uninstall a previous version of one of software applications 940; install update 938; and preserve, remove or transform data 946 associated with the previous version of this software application.

Note that at least some of the data stored in memory 924 and/or at least some of the data communicated using communication module 928 is encrypted using encryption module 934.

Instructions in the various modules in memory 624 (FIG. 6) and memory 924 may be implemented in: a high-level procedural language, an object-oriented programming language, and/or in an assembly or machine language. Note that the programming language may be compiled or interpreted, e.g., configurable or configured, to be executed by the one or more processors 610 (FIG. 6) and 910, respectively.

Although computer system 600 (FIG. 6) and portable electronic device 900 are illustrated as having a number of discrete items, FIGS. 6 and 9 are intended to be a functional description of the various features that may be present in computer system 600 (FIG. 6) rather than a structural schematic of the embodiments described herein. Furthermore, in practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 (FIG. 6) and portable electronic device 900 may be implemented in one or more application-specific integrated circuits (ASICs) and/or one or more digital signal processors (DSPs).

In exemplary embodiments, software applications 638 (FIG. 6) and 940 include a financial-software application, such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial-software application may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash/), Tally.ERP (from Tally Solutions, Ltd., of Bangalore, India) and/or other payroll or accounting software capable of processing payroll information.

Computers, servers and portable electronic devices in system 500 (FIG. 5), computer system 600 (FIG. 6) and/or portable electronic device 900 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 512 (FIG. 5) may include: a wireless network (such as a cellular-telephone network), the Internet, World Wide Web (, an intranet, LAN, WAN, MAN, or a combination of networks, or other technology enabling communication between computing systems and/or electronic devices.

System 500 (FIG. 5), computer system 600 (FIG. 6), data structure 700 (FIG. 7), data structure 800 (FIG. 8) and/or portable electronic device 900 may include fewer components or additional components. Moreover, two or more components may be combined into a single component, and/or a position of one or more components may be changed. In some embodiments, the functionality of system 500 (FIG. 5), computer system 600 (FIG. 6) and/or portable electronic device 900 may be implemented more in hardware and less in software, or less in hardware and more in software, as is known in the art.

While the preceding discussion illustrated the use of the update technique in conjunction with software applications, more generally this approach may be used to facilitate updates for a wide variety of content on portable electronic devices. For example, the content may include a medical document (such as a medical report or a medical record associated with a user) that is associated with a medical software application, such as: a diagnostic program, an electronic medical record program, a medical billing program, etc.

Furthermore, while the preceding discussion illustrated the use of the update technique in conjunction with a single provider or application developer, as shown in FIG. 5, in other embodiments the update technique may be offered as a service (such as a mobile application publishing and delivery service) to: multiple providers or application developers, other companies (such as mobile application stores) and/or companies that implement application management systems. For example, server 212 may provide this service to application developers 514.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for providing an update for a plurality of software applications to a plurality of portable electronic devices, comprising:
 receiving, at the computer, the update to the plurality of software applications from a provider of the plurality of software applications, wherein each software application in the plurality of software applications has a unique application identifier;
 after receiving the update, accessing, at the computer, inventory information about each portable electronic device in the plurality of portable electronic devices;
 dynamically generating, at the computer, an identifier for the update for each portable electronic device in the plurality of portable electronic devices based on the inventory information and on update information that specifies an update relationship between the update and a previous version of the software application; and
 providing the update along with a first dynamically generated identifier to a first portable electronic device in the plurality of portable electronic devices, wherein the first dynamically generated identifier is used by the first portable electronic device to determine a selection of workflow tasks to be executed in the first portable electronic device, thereby causing the first portable electronic device to update a first software application from the plurality of software applications with the update;
 providing the update along with a second dynamically generated identifier to a second portable electronic device in the plurality of portable electronic devices, wherein the second dynamically generated identifier is used by the second portable electronic device to determine a selection of workflow tasks to be executed in the second portable electronic device, thereby causing the second portable electronic device to update a second software application from the plurality of software applications with the update; and
 wherein the second software application has a different identifier from the first software application and wherein the second software application and the first software application are updated from the same update.

2. The method of claim 1, wherein, prior to accessing the inventory information, the method further includes receiving the update information from the provider of the software application.

3. The method of claim 1, wherein the method further includes generating the update information based on information about the previous version of the software application.

4. The method of claim 1, wherein the inventory information includes a request for the update to the software application.

5. The method of claim 1, wherein the update information specifies a history of software applications installed on the first portable electronic device and updates to the software applications that were received by the first portable electronic device.

6. The method of claim 1, wherein the inventory information indicates at least one of a model of the first portable electronic device, a hardware configuration of the first portable electronic device, a software configuration of the first portable electronic device, a hardware and a software configuration of the first portable electronic device, and a carrier that provides communication service to the first portable electronic device.

7. The method of claim 1, wherein the dynamically generated identifier is specific to each portable electronic device in the plurality of portable electronic devices.

8. The method of claim 1, wherein the dynamically generated identifier is configured to be used by an application management system, which is installed on the first portable electronic device, and which determines if the update workflow is executed.

9. The method of claim 1, wherein the first dynamically generated identifier is configured to be used by an operating system, which is installed on the first portable electronic device, and which determines if the update workflow is executed.

10. The method of claim 1, wherein the first dynamically generated identifier includes an application identifier and a version number.

11. A non-transitory computer-program product for use in conjunction with a computer system, the computer-program product comprising a computer-readable storage medium and a computer-program mechanism embedded therein, to provide an update for a plurality of software applications to a plurality of portable electronic devices, the computer-program mechanism including:
 instructions for receiving the update to the plurality of software applications from a provider of the plurality of software applications, wherein each software application in the plurality of software applications has a unique application identifier;
 instructions for accessing, at a server for the provider of the software application, inventory information from each portable electronic device in the plurality of portable electronic devices after receiving the update, wherein updates to software applications on the plurality of portable electronic devices are managed by an application management system that only allows updates to software applications if the software applications and the updates to the software applications have the same identifier;
 instructions for dynamically generating, at the server, an identifier for the update for each portable electronic device in the plurality of portable electronic devices based on the inventory information and on update information that specifies an update relationship between the update and a previous version of the software application; and
 instructions for providing the update to the software application and a first dynamically generated identifier to a first portable electronic device in the plurality of portable electronic devices, wherein the first dynamically generated identifier is used by the first portable electronic device to determine a selection of workflow tasks to be executed in the first portable electronic device, thereby causing the first portable electronic device to update a first software application from the plurality of software applications with the update;
 instructions for providing the update to the software application and a second dynamically generated identifier to a second portable electronic device in the plurality of portable electronic devices, wherein the second dynamically generated identifier is used by the second portable electronic device to determine a selection of workflow tasks to be executed in the second portable electronic device, thereby causing the second portable electronic device to update a second software application from the plurality of software applications with the update;
 wherein the second software application has a different identifier from the first software application and wherein the second software application and the first software application are updated from the same update.

12. The computer-program product of claim 11, wherein the computer-program mechanism further includes instructions for receiving the update information from the provider of the software application prior to accessing the inventory information.

13. The computer-program product of claim 11, wherein the computer-program mechanism further includes instructions for generating the update information based on information about the previous version of the software application.

14. The computer-program product of claim 11, wherein the inventory information includes a request for the update to the software application.

15. The computer-program product of claim 11, wherein on the update information specifies a history of software applications installed on the first portable electronic device and updates to the software applications that were received by the first portable electronic device.

16. The computer-program product of claim 11, wherein the inventory information indicates at least one of a model of the first portable electronic device, a hardware configuration of the first portable electronic device, a software configuration of the first portable electronic device, a hardware and a software configuration of the first portable electronic device, and a carrier that provides communication service to the first portable electronic device.

17. The computer-program product of claim 11, wherein the dynamically generated identifier is specific to each portable electronic device in the plurality of portable electronic devices.

18. A computer system, comprising:
a processor;
memory; and
a program module, wherein the program module is stored in the memory and configurable to be executed by the processor to provide an update for a plurality of software applications to a plurality of portable electronic devices, the program module including:
instructions for receiving the update to the plurality of software applications from a provider of the plurality of software applications, wherein each software application in the plurality of software applications has a unique application identifier;
instructions for accessing, at a server for the provider of the software application, inventory information from each portable electronic device in the plurality of portable electronic devices after receiving the update, wherein updates to software applications on the plurality of portable electronic devices are managed by an application management system that only allows updates to software applications if the software applications and the updates to the software applications have the same identifier;
instructions for dynamically generating, at the server, an identifier for the update for each portable electronic device in the plurality of portable electronic devices based on the inventory information and on update information that specifies an update relationship between the update and a previous version of the software application; and
instructions for providing the update to the software application and a first dynamically generated identifier to a first portable electronic device in the plurality of portable electronic devices, wherein the first dynamically generated identifier is used by the first portable electronic device to determine a selection of workflow tasks to be executed in the first portable electronic device, thereby causing the first portable electronic device to update a first software application from the plurality of software applications with the update;
instructions for providing the update to the software application and a second dynamically generated identifier to a second portable electronic device in the plurality of portable electronic devices, wherein the second dynamically generated identifier is used by the second portable electronic device to determine a selection of workflow tasks to be executed in the second portable electronic device, thereby causing the second portable electronic device to update a second software application from the plurality of software applications with the update;
wherein the second software application has a different identifier from the first software application and wherein the second software application and the first software application are updated from the same update.

19. The method of claim 1, wherein the computer comprises a server for the provider of the software application that is separate from the first portable electronic device, and
wherein providing the update along with the first dynamically generated identifier to the first portable electronic device comprises providing the update along with the first dynamically generated identifier from the computer to the first portable electronic device.

20. The method of claim 1, wherein generating, at the computer, the identifier for the update for the first portable electronic device based on the inventory information comprises using the previous version of the software application specified in the inventory information.

* * * * *